(12) United States Patent
Marupaduga

(10) Patent No.: US 11,240,715 B1
(45) Date of Patent: Feb. 1, 2022

(54) COOPERATIVE USE OF SECONDARY-NODE DATA LOAD AND UE DATA LOAD AS BASIS TO CONTROL CONFIGURATION OF DUAL CONNECTIVITY FOR UE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/948,398

(22) Filed: Sep. 16, 2020

(51) Int. Cl.
*H04W 36/00* (2009.01)
*H04W 36/08* (2009.01)

(52) U.S. Cl.
CPC ....... *H04W 36/0069* (2018.08); *H04W 36/08* (2013.01)

(58) Field of Classification Search
CPC .......................... H04W 36/0069; H04W 36/08
USPC ........................................................ 455/436
See application file for complete search history.

(56) References Cited

U.S. PATENT DOCUMENTS

| | | | |
|---|---|---|---|
| 9,271,212 B1* | 2/2016 | Hou | H04W 36/22 |
| 9,686,677 B2 | 6/2017 | Pinheiro et al. | |
| 10,172,177 B2 | 1/2019 | Gheorghiu et al. | |
| 2014/0187243 A1* | 7/2014 | Rune | H04W 36/26 |
| | | | 455/436 |
| 2015/0282239 A1* | 10/2015 | Han | H04W 76/27 |
| | | | 370/329 |
| 2017/0026888 A1* | 1/2017 | Kwan | H04W 24/02 |
| 2018/0167843 A1* | 6/2018 | Dribinski | H04W 24/02 |
| 2019/0021036 A1* | 1/2019 | Shimizu | H04W 36/08 |
| 2019/0349827 A1* | 11/2019 | Lei | H04W 28/0289 |
| 2020/0045583 A1* | 2/2020 | Kim | H04W 76/15 |

* cited by examiner

*Primary Examiner* — Charles N Appiah
*Assistant Examiner* — Frank E Donado

(57) ABSTRACT

A method and system for controlling configuration of dual connectivity of a UE in a system where the UE is served by a first access node over a first air-interface connection and in which configuring the dual connectivity includes adding for the UE a second air-interface connection with a second access node to facilitate concurrent service of the UE by the first access node over the first connection and the second access node over the second connection. An example method includes determining whether both (i) the second access node is threshold highly loaded and (ii) the UE is likely to engage in a threshold high extent of data communication when served by the second access node. And the example method includes, responsive to the determination being affirmative, forgoing from adding for the UE the second air-interface connection between the UE and the second access node.

19 Claims, 3 Drawing Sheets

WHEN A UE IS SERVED BY A FIRST ACCESS NODE OVER A FIRST AIR-INTERFACE CONNECTION, MAKE A DETERMINATION OF WHETHER BOTH (i) A SECOND ACCESS NODE THAT COULD BE ADDED AS A SECONDARY NODE FOR DUAL CONNECTIVTIY SERVICE OF THE UE IS THRESHOLD HIGHLY LOADED AND (ii) THE UE IS LIKELY TO ENGAGE IN A THRESHOLD HIGH EXTENT OF DATA COMMUNICATION WHEN SERVED BY THE SECOND ACCESS NODE — 36

RESPONSIVE TO THE DETERMINATION BEING AFFIRMATIVE, FORGO FROM ADDING FOR THE UE A SECOND AIR-INTERFACE CONNECTION BETWEEN THE UE AND THE SECOND ACCESS NODE — 38

COOPERATIVE USE OF SECONDARY-NODE DATA LOAD AND UE DATA LOAD AS BASIS TO CONTROL CONFIGURATION OF DUAL CONNECTIVITY FOR UE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

Further, on the downlink and uplink channels, the coverage of each access node could define an air interface configured in a specific manner to define physical resources for carrying information wirelessly between the access node and UEs.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry signals that UEs could detect as an indication of the presence of coverage, to establish frame timing, and to gauge coverage strength, and other resource elements could be reserved to carry other control signaling such as PRB-scheduling directives and acknowledgement messaging from the access node to served UEs. And on the uplink, certain resource elements could be reserved to carry random access signaling from UEs to the access node, and other resource elements could be reserved to carry other control signaling such as PRB-scheduling requests and acknowledgement signaling from UEs to the access node.

OVERVIEW

When a UE enters into coverage of such a system, the UE could detect threshold strong coverage of an access node (e.g., a threshold strong reference signal broadcast by the access node) and could then engage in random-access and connection signaling with the access node to establish an air-interface connection, such as a Radio Resource Control (RRC) connection, through which the access node will then serve the UE.

Further, if the UE is not already registered for service with the core network, the UE could transmit to the access node an attach request, which the access node could forward to a core-network controller for processing. And the core-network controller and access node could then coordinate setup for the UE of at least one user-plane bearer, including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs if and when available in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission to the access node. With the example air-interface configuration noted above, the access node could then allocate uplink PRBs if and when available in an upcoming subframe to carry a transport block of the data from the UE and could transmit to the UE a DCI message that designates those upcoming PRBs. And the UE could then accordingly transmit the transport block to the access node in the designated PRBs.

In practice, this wireless packet data transmission process may encounter some delay, possibly as a result of the access node's air interface being heavily loaded (e.g., having high PRB utilization) with communication traffic. And this delay may result in increased data buffering. For instance, when an access node is serving extensive uplink data communications, there may be some wait for availability of uplink PRBs, and so the extent of data buffered by a served UE awaiting uplink transmission, as indicated by the UE's BSRs, may grow. And likewise, when the access node is serving extensive downlink data communications, there may be some wait for availability of downlink PRBs, and so the extent of data buffered by the access node awaiting downlink transmission may grow. Further, the access node may also apply a packet discard timer governing how long the access node would buffer a given packet before the access node then discards the packet (as being held too long).

One way to help address such transmission delay and/or to otherwise improve wireless packet data communications is by use of dual-connectivity service, where a UE is served concurrently on two or more co-existing connections, perhaps according to multiple different RATs.

In an example system, for instance, a first access node could provide service according to a first RAT and a second access node could provide service according to a second RAT, and a UE positioned concurrently within coverage of both the first and second access nodes could have a first radio configured to engage in service according to the first RAT and a second radio configured to engage in service according to the second RAT. With this arrangement, the UE within coverage of both access nodes may be able to establish a first air-interface connection with the first access node according to the first RAT and a second air-interface connection with the second access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection (as "standalone" connectivity).

In a representative dual-connectivity implementation, the first access node operating according to the first RAT ("first-RAT access node") could function as a primary access node or master node (MN), responsible for coordinating setup and teardown of dual-connectivity service for the UE and functioning as an anchor point for RRC signaling and core-network control signaling related to the dual-connected UE. And the second access node operating according to the second RAT ("second-RAT access node") could function as a secondary access node or secondary node (SN) mainly to provide additional connectivity and increased aggregate bandwidth for the UE.

In such an implementation, when the UE enters into coverage of such a system, the UE could initially scan for and discover threshold strong coverage of the MN under the first RAT, and the UE could responsively engage in signaling as discussed above to establish a first-RAT air-interface connection between the UE and the MN. Further, the UE could engage in attach signaling with a core-network controller via the MN, and the core-network controller and MN could coordinate establishment for the UE of at least one bearer as discussed above.

The MN could then serve the UE in a standalone mode with packet-data communications in the manner described above. Further, perhaps having determined from profile data that the UE is dual-connectivity-capable, the MN could engage in a process to configure dual connectivity for the UE.

In an example dual-connectivity configuration process, the MN could first identify an SN with which to establish a second-RAT air-interface connection for the UE. And the MN could then engage in an SN-addition process to add for the UE a second-RAT connection between the UE and the SN, and in signaling to set up for the UE a split bearer so that the MN and SN can then cooperatively serve the UE with packet-data communications.

In an example SN-addition process, the MN could first transmit over an X2 interface or other inter-access-node interface to the SN an SN-addition request message, providing RRC configuration information and/or other information for the second-RAT connection, and the SN could then responsively allocate resources for the second-RAT connection and reply to the MN with an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then transmit a random-access signal to the SN, and the SN could respond to the UE with a random-access response message, which could complete establishment of the second-RAT connection for the UE.

Further, an example split-bearer setup process could involve the MN engaging in signaling with the core-network controller, the SN, and the UE to arrange for splitting of the UE's access bearer, and to arrange for splitting of data flow between the UE's first-RAT connection and the UE's second-RAT connection. For example, the MN could engage in signaling with the core-network controller and the SN to arrange for transfer of the access-bearer portion of at least one of the UE's one or more bearers from being between the gateway system and the MN to instead being between the gateway system and the SN, and to arrange for exchange of a portion of the UE's data flow over an X2 interface or other inter-access-node interface between the SN and the MN, with the SN and UE applying designated downlink and uplink data splits.

With dual-connectivity so configured by way of example, the MN and SN could then serve the UE with packet-data communications over their respective connections with the UE, with each access node coordinating air-interface communication in the manner described above.

In the downlink direction, for example, when the gateway system has data destined to the UE, the gateway system could transmit the data over the UE's access bearer to the SN, and, per a designated downlink data split, the SN could transmit a portion of that data over an X2 interface the MN for handling and could handle the remainder of the data itself. In the manner discussed above, for instance, each access node could buffer its respective portion of the data, allocate downlink PRBs of the access node's respective air interface if and when available, and transmit the buffered data to the UE in the allocated downlink PRBs, and each access node might apply a packet discard timer according to which the access node may discard packets held threshold long pending transmission.

And in the uplink direction, when the UE has data to transmit, per a designated uplink data split, the UE could transmit a portion of its data over its first-RAT connection to the MN, which the MN could forward over an X2 interface to the SN and the SN could forward over the UE's access bearer to the gateway system, and the UE could transmit another portion of its data over its second-RAT connection to the SN, which the SN could likewise forward over the UE's access bearer to the gateway system. In the manner discussed above, for instance, for the portion of data to be transmitted respectively over each connection, the UE could buffer the data and send to the access node a scheduling request with a BSR indicating the quantity of data that the UE has buffered for transmission to that access node, the access node could allocate uplink PRBs of the access node's respective air-interface if and when available, and the UE could transmit the buffered data to the access node in the allocated uplink PRBs.

One technical consideration in such a system is whether having an access node serve as an SN for dual-connectivity service of a UE could exacerbate an existing load problem at that access node.

For instance, at issue may be a situation where the access node that would be added as an SN for the UE is threshold heavily loaded in the first place, and historical usage data shows that the UE is likely to place a relatively high data-communication demand on the access node as SN for the UE and therefore to significantly increase the access node's load problem, possibly causing associated delay and other service issues. In that scenario, it may be better to avoid adding the access node as an SN for the UE and to instead have the UE continue to operate with standalone service or perhaps add a different access node as an SN for dual-connectivity service of the UE.

The present disclosure provides a mechanism to help address this.

In accordance with the disclosure, when a UE's serving MN (e.g., sole serving access node) is considering whether to add an access node as an SN for dual-connectivity service of the UE, the MN will make a determination of whether both (i) the access node is threshold heavily loaded and (ii) service of the UE by the access node is likely to contribute threshold significantly to that load situation, such as the UE being likely to engage in a threshold high extent of data communication when served by the access node. And in response to at least that determination being affirmative, the MN will forgo adding the access node as SN for dual-connectivity service of the UE.

Furthermore, this process could be carried out with respect to downlink communication and/or uplink communication.

As to the downlink, for instance, the MN could determine that the access node has threshold high downlink load and that the UE is likely to engage in a threshold high extent of downlink communication when served by the SN, and the MN could responsively forgo adding the access node as SN for the UE. And as to the uplink, for instance, the MN could determine that the access node has threshold high uplink load and that the UE is likely to engage in a threshold high extent of uplink communication when served by the SN, and the MN could responsively forgo adding the access node as SN for the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

Figure 1:
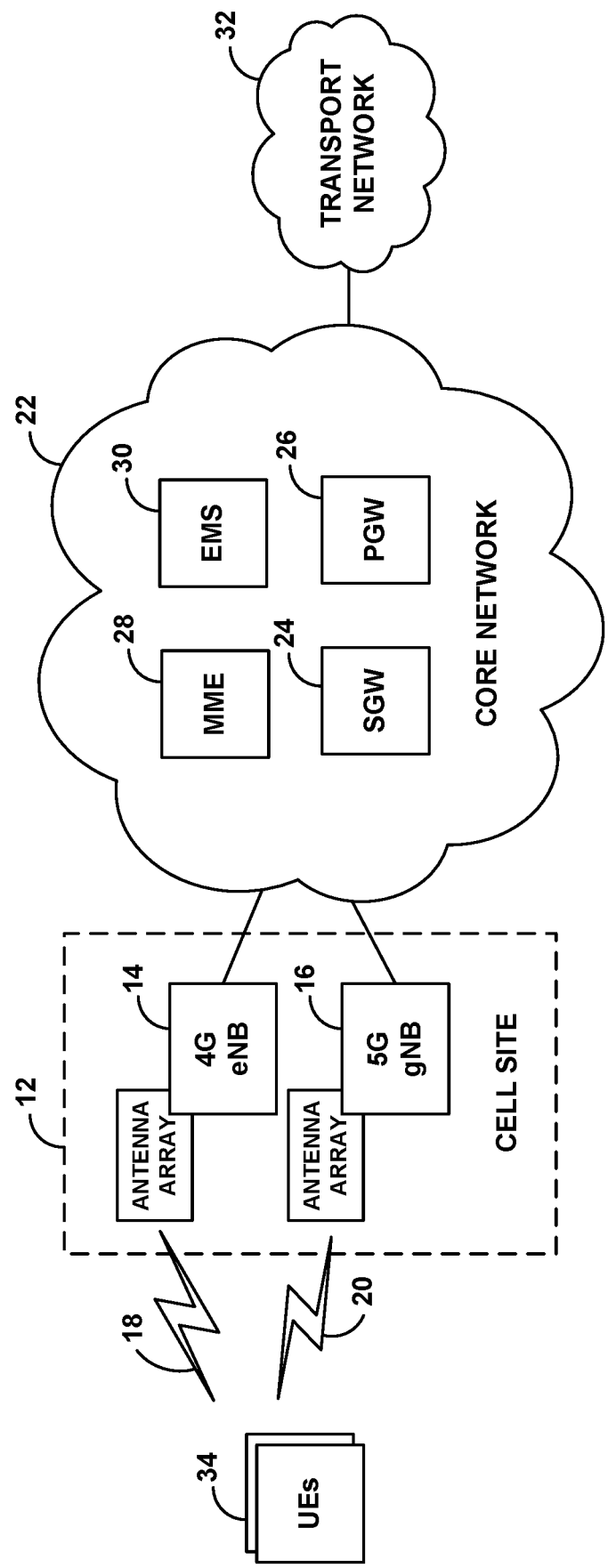
FIG. 1 is a simplified block diagram of an example network arrangement in which features of the present disclosure can be implemented.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, relays, femtocell access nodes, or the like, possibly configured to provide a smaller range of coverage. And while shown as being at a common cell site, the access nodes could alternatively be separately located.

Each access node could have a respective antenna structure, such as an antenna array, that is configured to transmit and receive electromagnetic signals in a region defined by an antenna pattern or radiation pattern, or the access nodes could share portions of a common antenna array for this purpose. And each access node could be configured to provide coverage on at least one respective carrier according to a respective RAT. For instance, the 4G eNB 14 could provide 4G coverage 18 on one or more 4G carriers, and the 5G eNB 16 could provide 5G coverage 20 on one or more 5G carriers.

Further, the air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In the example arrangement of FIG. 1, the 4G eNB 14 and 5G gNB 16 are both interfaced with a core network 22, such as an Evolved Packet Core (EPC) network or Next Generation Core (NGC) network. In the example shown, the core network 22 includes a serving gateway (SGW) 24, a packet data network gateway (PGW) 26, a mobility management entity (MME) 28, and an element management system (EMS) 30, although other arrangements are possible as well.

In an example implementation, without limitation, each access node could have an interface with the SGW 24, the SGW 24 could have an interface with the PGW 26, and the PGW 26 could provide connectivity with a transport network 32. Further, each access node could have an interface with the MME 28, and the MME 28 could have an interface with the SGW 24, so that the MME 28 could coordinate setup of bearers for UEs to enable the UEs to engage in packet-data communication via 4G and 5G. Alternatively, just the 4G eNB 14 might have an interface with the MME 28 and may function as an anchor for signaling with the MME 28 both for 4G service and for 5G and EN-DC service. Still further, the EMS 30 could operate as a central repository of operational data for the wireless communication network and to control and manage operation of various network elements such as the access nodes.

FIG. 1 also illustrates multiple example UEs 34 that may from time to time be within coverage of the 4G eNB 14 and/or the 5G gNB 16. Some or all these UEs could be equipped with a 4G LTE radio and/or a 5G NR radio, and could include associated circuitry and logic that enables the UE to engage in 4G LTE service and/or 5G NR service, and perhaps EN-DC service. Further, the 4G eNB 14 and 5G gNB 16 could be configured to serve multiple such UEs at once.

Upon entering into coverage of cell site 12, a representative such UE could scan for and discover coverage and could then responsively engage in signaling to establish an RRC connection. For instance, if the UE supports just 4G service or if the UE supports EN-DC service, the UE might initially scan for 4G coverage and discover threshold strong coverage of 4G eNB 14, and the UE may then responsively engage in random access and RRC signaling with the 4G eNB 14 to establish a 4G connection between the UE and the 4G eNB 14. Whereas, if the UE supports just 5G service, the UE might initially scan for 5G coverage and discover threshold strong coverage of the 5G gNB 16, and the UE may then responsively engage in random access and RRC signaling with the 5G gNB 16 to establish a 5G connection between the UE and the 5G gNB 16.

Once the UE is connected with an access node, the UE could then transmit to the access node an attach request message, which the access node could forward to the MME 28 for processing. And upon authenticating and authorizing the UE for service, the MME 28 and access node could coordinate setup for the UE of at least one user-plane bearer. For instance, the MME 28 could engage in signaling with the access node and the SGW 24 to coordinate setup for the UE of an S1-U packet tunnel between the access node and the SGW 24, and the SGW 24 could responsively engage in signaling with the PGW 26 to coordinate setup for the UE of an associated S5 packet tunnel between the SGW 24 and the PGW 26. Further, the access node could engage in signaling with the UE to establish for the UE an associated data radio bearer (DRB).

And once the UE is so connected and attached, the access node could then serve the UE in a standalone mode, as discussed above.

Namely, for downlink data arriving at the access node for transmission over the air to the UE, the access node could buffer the data pending transmission, the access node could allocate downlink PRBs if and when available and transmit the data to the UE in the allocated downlink PRBs, and the access node could discard packet data that has been buffered too long pending downlink transmission. And for uplink data that the UE has for transmission to the access node, the UE could buffer the data and send to the access node a scheduling request with BSR indicating how much data the UE has buffered for transmission to the access node, the access node could allocate uplink PRBs if and when available, and the UE could transmit the data to the access node in the allocated uplink PRBs.

For each of one or more of these UEs that connects with the 4G eNB 14, the 4G eNB 14 could also transmit to the UE an RRC message carrying a UE-capability enquiry, and the UE could respond to the 4G eNB 14 with a "UE capability information" information element (IE), which could indicate whether the UE is EN-DC capable. Alternatively, the 4G eNB 14 could discover in another manner whether the UE is EN-DC capable.

And for each such EN-DC-capable UE, the 4G eNB 14 could then work to configure EN-DC service. In line with the discussion above, for instance, the 4G eNB 14, operating as MN, could first engage in process to add the 5G gNB 16 as an SN for the UE, such as by transmitting to the 5G gNB 16 an SN-Addition request to cause the 5G gNB to allocate resources for a 5G connection for the UE on one or more 5G carriers, receiving an SN-Addition-Request acknowledge message from the 5G gNB 16, and engaging in associated RRC signaling with the UE, in response to which the UE could then access and complete establishment of the 5G connection. Further, the 4G eNB 14 could engage in signaling as described above to transfer to the UE's access bearer (e.g., the UE's S1-U tunnel) to the 5G gNB as well and otherwise to set up a split bearer for the UE.

The 4G eNB 14 and 5G gNB 16 could then provide the UE with EN-DC service, concurrently serving the UE over their respective connections with the UE as discussed above. Namely, as each access node receives data that it will transmit over its respective air interface to the UE, the access node could buffer that data, allocate downlink PRBs of the access node's respective air interface if and when available, and transmit the buffered data to the UE in the allocated downlink PRBs, discarding any packets held threshold long pending transmission. And as the UE has data for transmission respectively to each UE, the UE could buffer the data and send to the access node a scheduling request with a BSR indicating the quantity of data that the UE has buffered for transmission to that access node, the access node could allocate uplink PRBs of the access node's respective air-interface if and when available, and the UE could transmit the buffered data to the access node in the allocated uplink PRBs.

In line with the discussion above, the present disclosure could provide for controlling whether the 4G eNB 14 would add the 5G gNB 16 as an SN for EN-DC service of the UE, with the controlling being based on whether (i) the 5G gNB 16 is threshold heavily loaded and (ii) service of the UE by the 5G gNB 16 is likely to contribute threshold significantly to that load situation. Moreover, as noted above, this could be done with respect to downlink communication and/or with respect to uplink communication.

As discussed above, for instance, when considering whether to add the 5G gNB 16 as an SN for EN-DC service of the UE, the 4G eNB 14 could first determine if the 5G gNB 16 is threshold heavily loaded. And if so, the 4G eNB 14 could then determine if service of the UE by the 5G gNB 16 is likely to contribute threshold significantly to that load situation if the 5G gNB 16 would be added as an SN for EN-DC service of the UE. If both of these criteria are met, then, based at least on at least those two criteria being met, the 4G eNB 14 could forgo adding the 5G gNB 16 as an SN for EN-DC service of the UE, perhaps blocking setup of EN-DC for the UE or instead selecting a different 5G gNB to be an SN for EN-DC service of the UE. Whereas, if at least one of the criteria is not met, then the 4G eNB 14 may proceed to add the 5G gNB 16 as an SN for EN-DC service of the UE, subject to possibly one or more other considerations.

Alternatively, note that the order of these operations could be reversed or conducted in parallel. For instance, the 4G eNB 14 might first determine if service of the UE by the 5G gNB 16 is likely to contribute threshold significantly to load of the 5G gNB 16 if the 5G gNB 16 would be added as an SN for EN-DC service of the UE. And if so, the 4G eNB 14 could then determine if the 5G gNB 16 is threshold heavily loaded. And responsive to both of these criteria being met, the 4G eNB 14 could forgo adding the 5G gNB 16 as an SN for EN-DC service of the UE.

Applying this process as to downlink communication, for example, the 4G eNB 14 could make a determination of whether both (i) the 5G gNB 16 is threshold highly loaded on the downlink and (ii) the UE is likely to engage in a threshold great extent of downlink packet data communication. If the determination is affirmative, then, based at least on the determination, the 4G eNB 14 could forgo adding the 5G gNB 16 as an SN for EN-DC service of the UE. Whereas, if the determination is negative (e.g., at least one of the two criteria is met), then, based at least on the determination, then the 4G eNB 14 may proceed to add the 5G gNB as an SN for EN-DC service of the UE.

And applying this process as to uplink communication, the 4G eNB 14 could make a determination of whether both (i) the 5G gNB 16 is threshold highly loaded on the uplink and (ii) the UE is likely to engage in a threshold great extent of uplink packet data communication. If the determination is affirmative, then, based at least on the determination, the 4G eNB 14 could forgo adding the 5G gNB 16 as an SN for EN-DC service of the UE. Whereas, if the determination is negative (e.g., at least one of the two criteria is met), then, based at least on the determination, then the 4G eNB 14 may proceed to add the 5G gNB as an SN for EN-DC service of the UE.

Further, the 4G eNB 14 could combine the downlink and uplink analyses. For instance, the 4G eNB 14 could consider load cooperatively over the downlink and the uplink and/or likelihood of UE data communication cooperatively on the downlink and the uplink, as a basis to control whether to add the 5G gNB 16 as an SN for EN-DC service of the UE. Or the 4G eNB 14 could determine that the 5G gNB 16 is threshold heavily loaded on the downlink and that the UE is likely to engage in a threshold great extent of uplink data communication, as a basis to control whether to add the 5G gNB 16 as an SN for EN-DC service of the UE.

In any of these processes, the level of load of the 5G gNB 16 could take various forms, and could be measured with respect to the 5G gNB's service on a carrier on which the UE would connect with the 5G gNB 16 and/or on multiple carriers on which the 5G gNB 16 provides service, among other possibilities. At issue could then be whether the 5G gNB's level of load is threshold high, such as whether the 5G gNB's level of load is at least as high as a predefined threshold load level.

As to the downlink, for instance, the 5G gNB's level of load could be gauged by one or more of (i) the 5G gNB's downlink PRB utilization, such as a percentage of the downlink PRBs that the 5G gNB 16 allocates per unit time, perhaps on average per frame or other interval, (ii) the 5G gNB's downlink data usage, such as the quantity of data that the 5G gNB 16 transmits on average per unit time, (iii) the 5G gNB's level of downlink buffer fullness, such as quantity of data that the 5G gNB 16 has buffered awaiting downlink transmission, and (iv) the 5G gNB's packet discard rate, which as noted above could correlate with how much data the 5G gNB 16 buffers for downlink data transmission, among other possibilities.

And as to the uplink, the 5G gNB's level of load could be gauged by one or more of (i) the 5G gNB's uplink PRB utilization, such as a percentage of the uplink PRBs that the 5G gNB 16 allocates per unit time, perhaps on average per frame or other interval, (ii) the 5G gNB's uplink data usage, such as the quantity of data that the 5G gNB 16 receives from one or more of its served UEs on average per unit time, and (iii) BSR reports that the 5G gNB 16 receives from one or more of its served UEs, which as noted above could indicate the quantity of data that the 5G gNB's served UEs have buffered for transmission to the 5G gNB 16, among other possibilities.

The 5G gNB 16 could periodically or otherwise from time to time report one or more of these or other such measures of its level of load and/or associated indicia of whether the 5G gNB 16 is threshold highly loaded, and the 4G eNB 14 could determine based on that reporting the 5G gNB's level of load or whether the 5G gNB is threshold high loaded. For instance, the 5G gNB 16 could report one or more such load measures or indicia over an X2 interface to the 4G eNB 14. Or the 5G gNB 16 could report one or more such load measures or indicia directly or indirectly to the MME 28 or EMS 30, and the 4G eNB could determine the 5G gNB's level of load and/or whether the 5G gNB's level of load is threshold high by querying the MME 28 or EMS 30.

Further, the determination of whether the 5G gNB's level of load is threshold high could be based on most recent such load reporting from the 5G gNB 16. Alternatively, if records of the 5G gNB's load are timestamped or otherwise correlated with time, the determination of whether the 5G gNB's level of load is threshold high could be a prediction based on other historical such load data, such as data establishing that the 5G gNB 16 has tended to be threshold highly loaded at the current time of day on past days, among other possibilities.

In addition, in any of the above processes, the determination of whether service of the UE by the 5G gNB 16 is likely to contribute significantly to the load of the 5G gNB 16 (if the 5G gNB 16 would be added as an SN for EN-DC service of the UE) could be based on an evaluation of the UE's data load, such as the extent of data communicated to or from the UE or buffered for transmission to or from the UE, with respect to service of the UE by the 4G eNB 14 and/or by one or other serving access nodes, among other possibilities. In particular, at issue could be whether the UE's data load is threshold high, such as at least as high as a predefined threshold data load level.

As to the downlink, for instance, the UE's data load could be gauged by one or more of (i) the UE's downlink data usage, such as the quantity of data that has been transmitted to the UE on average per unit time, (ii) downlink buffer fullness as to data buffered for transmission specifically to the UE, and (iii) packet discard rate as to packets awaiting transmission specifically to the UE, among other possibilities. And as to the uplink, for instance, the UE's data load could be gauged by one or more of (i) the UE's uplink data usage, such as the quantity of data that has been transmitted from the UE on average per unit time and (ii) BSR reporting from the UE, indicating quantity of data that the UE has buffered for transmission, among other possibilities.

Each of one or more access nodes that serves the UE over time could periodically or otherwise from time to time report one or more of these or other such measures of the UE's data load to the MME 28 or EMS 30. And the 4G eNB 14 could determine the UE's level of data load based on this reporting, such as by querying the MME 28 or EMS 30.

Further, as with the 5G gNB load, the determination of whether the UE's data load is threshold high could be based on most recent such reports of the UE's data load. Alternatively, if records of the UE's data load are timestamped or otherwise correlated with time, the determination of whether the UE's data load is threshold high could be based on other historical data, such as a determination that the UE has tended to have threshold high data load at the current time of day on past days, or a determination that the UE's average data load over a recent sliding window of time is at least as high as a predefined threshold, among other possibilities.

Figure 2:
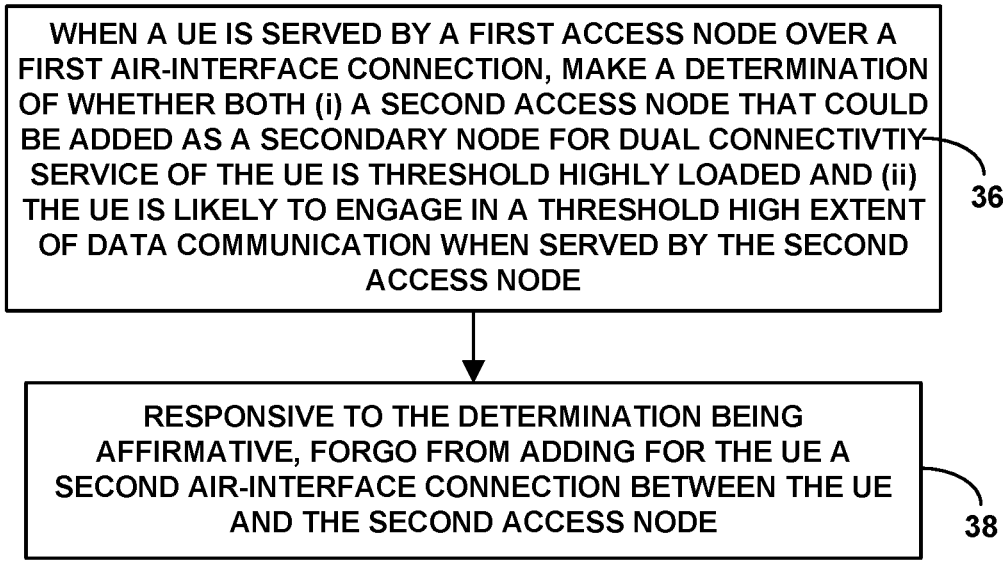
FIG. 2 is a flow chart depicting an example method in accordance with the present disclosure.

FIG. 2 is a flow chart depicting a method that can be carried out in accordance with the present disclosure, to control configuration of dual connectivity of a UE, in a system in which the UE is served by a first access node over a first air-interface connection between the UE and the first access node and in which configuration of the dual connectivity involves adding for the UE a second air-interface connection between the UE and the second access node, to enable concurrent service of the UE by the first access node over the first air-interface connection and the second access node over the second air-interface connection. As discussed above, this method could be carried out by the first access node.

As shown in FIG. 2, at block 36, the method includes making a determination of whether both (i) the second access node is threshold highly loaded and (ii) the UE is likely to engage in a threshold high extent of data communication when served by the second access node. And at block 38, the method includes, responsive to the determination being affirmative, forgoing from adding for the UE the second air-interface connection between the UE and the second access node.

In line with the discussion above, this method could additionally include the first access node identifying the second access node as a candidate secondary node for dual-connectivity service of the UE, with the making of the determination then occurring after that. For instance, the first access node could identify the second access node based on the UE reporting being within threshold strong coverage of the second access node and/or based on a coverage assumption.

Further, as discussed above, the act of making the determination could involve making a first determination that the second access node is threshold highly loaded and, responsive to making the first determination, then making a second determination that the UE is likely to engage in a threshold high extent of data communication when served by the second access node. Or the act of making the determination could involve making a first determination that the UE is likely to engage in a threshold high extent of data communication when served by the second access node and, responsive to at least making the first determination, then making a second determination that the second access node is threshold highly loaded.

Still further, as discussed above, the act of making the determination of whether both (i) the second access node is threshold highly loaded and (ii) the UE is likely to engage in a threshold high extent of data communication when served by the second access node could involve determining whether both (i) the second access node has threshold high downlink load and (ii) the UE is likely to engage in a threshold high extent of downlink data communication when served by the second access node.

As noted above, for instance, determining whether the second access node has threshold high downlink load could be based on one or more factors such as (i) downlink physical resource block utilization of the second access node, (ii) downlink data usage of the second access node (iii) downlink buffer fullness of the second access node, and/or (iv) downlink packet discard rate of the second access node. And that determining could be predictive based on past downlink load of the second access node.

Further, as noted above, determining whether the UE is likely to engage in the threshold high extent of downlink data communication when served by the second access node could be based on one or more factors such as (i) downlink data usage of the UE, (ii) downlink buffer fullness as to data buffered for transmission to the UE, and/or (iii) downlink packet discard rate as to packets awaiting transmission to the UE. And that determining could likewise be predictive based on past downlink data load of the UE.

Alternatively or additionally, as discussed above, the act of making the determination of whether both (i) the second access node is threshold highly loaded and (ii) the UE is likely to engage in a threshold high extent of data communication when served by the second access node could involve determining whether both (i) the second access node has threshold high uplink load and (ii) the UE is likely to engage in a threshold high extent of uplink data communication when served by the second access node.

As noted above, for instance, determining whether the second access node has threshold high uplink load could be based on one or more factors such as (i) uplink physical resource block utilization of the second access node, (ii) uplink data usage of the second access node, and/or (iii) uplink buffer fullness as to data buffered for transmission to the second access node. And that determining could similarly be predictive based on past uplink load of the second access node.

Further, as noted above, determining whether the UE is likely to engage in the threshold high extent of uplink data communication when served by the second access node could be based on one or more factors such as (i) uplink data usage of the UE and/or (ii) uplink buffer fullness as to data buffered for transmission from the UE. And that determining could similarly be predictive based on uplink data load of the UE.

As additionally discussed above, the act of forgoing from adding for the UE the second air-interface connection between the UE and the second access node could involve forgoing by the first access node from establishing dual-connectivity service for the UE, or perhaps adding for the UE a secondary connection with a different second access node instead.

Figure 3:
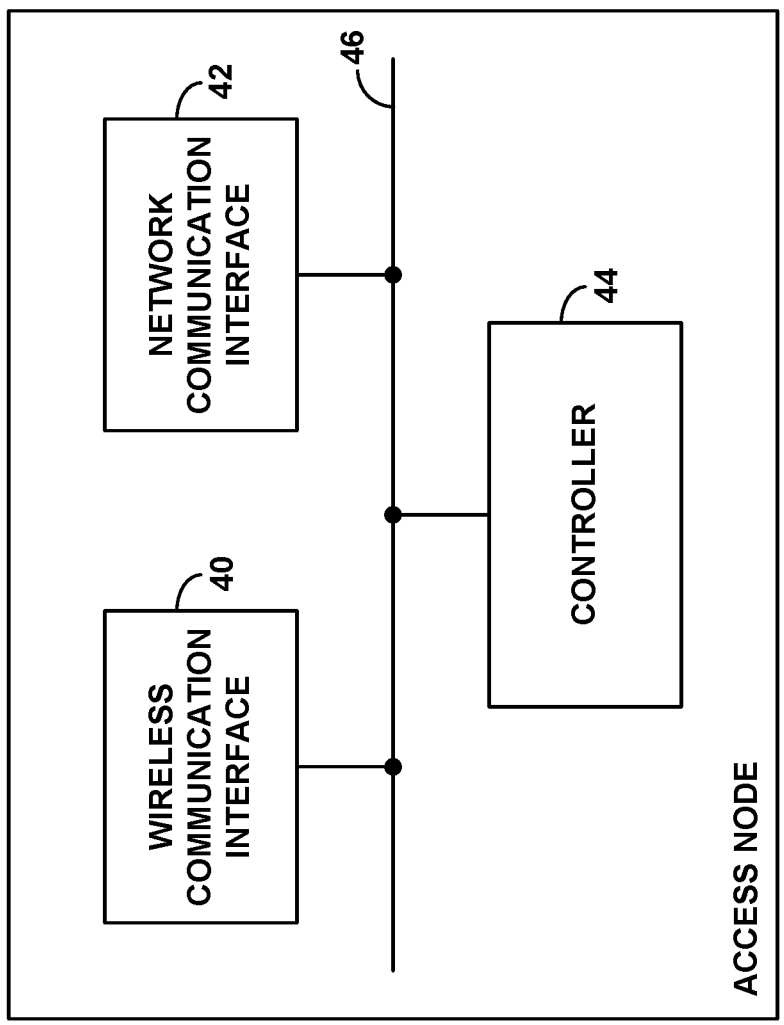
FIG. 3 is a simplified block diagram of an example access node operable in accordance with the present disclosure.

FIG. 3 is next a simplified block diagram of an example first access node that could be arranged to operate in accordance with the present disclosure, in a wireless communication system in which the first access node provides service on a first air interface and a second access node provides service on a second air interface.

As shown in FIG. 3, the example first access node includes a wireless communication interface 40, a network communication interface 42, and a controller 44, all of which could be integrated together and/or communicatively linked together by a system bus, network, or other connection mechanism 46.

In an example implementation, the wireless communication interface 40 could comprise an antenna structure, which could be tower mounted or could take other forms, and associated components such as a power amplifier and a wireless transceiver, so as to facilitate providing a coverage area defining the first air interface and engaging air-interface communication on the first air interface. And the network communication interface 42 could comprise a wired or wireless interface, such as an Ethernet network communication interface, configured to support communication with other entities, such as with the second access node and various core-network entities.

Further, controller 54 could comprise one or more processing units (e.g., one or more general purpose processors (e.g., microprocessors) and/or specialized processors) programmed to cause the first access node to carry out various operations such as those discussed herein. For instance, the controller could comprise one or more non-transitory data storage units (e.g., one or more magnetic, optical, or flash storage components) which could store program instructions executable by the one or more processing units to cause the first access node to carry out such operations.

In line with the discussion above, for instance, these operations could include making a determination of whether both (i) the second access node is threshold highly loaded and (ii) the UE is likely to engage in a threshold high extent of data communication when served by the second access node. And the operations could include, responsive to the determination being affirmative, forgoing from adding for the UE the second air-interface connection between the UE and the second access node.

Various features described above could be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling configuration of dual connectivity of a user equipment device (UE) in a system in which the UE is served by a first access node over a first air-interface connection between the UE and the first access node and in which the configuration of the dual connectivity comprises adding for the UE a second air-interface connection between the UE and a second access node to enable concurrent service of the UE by the first access node over the first air-interface connection and the second access node over the second air-interface connection, the method comprising:

making a determination of whether both (i) the second access node is threshold highly loaded and (ii) the UE is likely to engage in a threshold high extent of data communication when served by the second access node; and responsive to the determination being affirmative, forgoing from adding for the UE the second air-interface connection between the UE and the second access node, wherein making the determination of whether both (i) the second access node is threshold highly loaded and (ii) the UE is likely to engage in a threshold high extent of data communication when served by the second access node comprises at least one of (a) determining whether both (i) the second access node has threshold high downlink load and (ii) the UE is likely to engage in a threshold high extent of downlink data communication when served by the second access node or (b) determining whether both (i) the second access node has threshold high uplink load and (ii) the UE is likely to engage in a threshold high extent of uplink data communication when served by the second access node.

2. The method of claim 1, wherein the method is carried out by the first access node.

3. The method of claim 2, further comprising identifying by the first access node the second access node as a candidate secondary node for dual-connectivity service of the UE, wherein the making of the determination occurs after the identifying.

4. The method of claim 2, wherein making the determination comprises making a first determination that the second access node is threshold highly loaded and, responsive to making the first determination, then making a second determination that the UE is likely to engage in a threshold high extent of data communication when served by the second access node.

5. The method of claim 2, wherein making the determination comprises making a first determination that the UE is likely to engage in a threshold high extent of data communication when served by the second access node and, responsive to at least making the first determination, then making a second determination that the second access node is threshold highly loaded.

6. The method of claim 2, wherein determining whether the second access node has threshold high downlink load is based on at least one factor selected from the group consisting of (i) downlink physical resource block utilization of the second access node, (ii) downlink data usage of the second access node (iii) downlink buffer fullness of the second access node, and (iv) downlink packet discard rate of the second access node.

7. The method of claim 6, wherein the determining whether the second access node has threshold high downlink load is predictive based on past downlink load of the second access node.

8. The method of claim 2, wherein determining whether the UE is likely to engage in the threshold high extent of downlink data communication when served by the second access node is based on at least one factor selected from the group consisting of (i) downlink data usage of the UE, (ii) downlink buffer fullness as to data buffered for transmission to the UE, and (iii) downlink packet discard rate as to packets awaiting transmission to the UE.

9. The method of claim 8, wherein the determining whether the UE is likely to engage in the threshold high extent of downlink data communication when served by the second access node is predictive based on past downlink data load of the UE.

10. The method of claim 2, wherein determining whether the second access node has threshold high uplink load is based on at least one factor selected from the group consisting of (i) uplink physical resource block utilization of the second access node, (ii) uplink data usage of the second access node, and (iii) uplink buffer fullness as to data buffered for transmission to the second access node.

11. The method of claim 10, wherein the determining whether the second access node has threshold high uplink load is predictive based on past uplink load of the second access node.

12. The method of 2, wherein determining whether the UE is likely to engage in the threshold high extent of uplink data communication when served by the second access node is based on at least one factor selected from the group consisting of (i) uplink data usage of the UE and (ii) uplink buffer fullness as to data buffered for transmission from the UE.

13. The method of claim 12, wherein the determining whether the UE is likely to engage in the threshold high extent of uplink data communication when served by the second access node is predictive based on past uplink data load of the UE.

14. The method of claim 2, wherein forgoing from adding for the UE the second air-interface connection between the UE and the second access node comprises forgoing by the first access node from establishing dual-connectivity service for the UE.

15. A first access node operable in a wireless communication system, wherein the first access provides service on a first air interface, and wherein the wireless communication system further includes a second access node that provides service on a second air interface, the first access node comprising:
 a wireless communication interface through which to engage in air-interface communication on the first air interface; and
 a controller, wherein the controller is configured to cause the first access node to carry out operations to control configuration of dual connectivity of a user equipment device (UE) when the UE is served by the first access node over a first air-interface connection between the UE and the first access node, wherein the configuration of the dual connectivity comprises adding for the UE a second air-interface connection between the UE and the second access node to enable concurrent service of the UE by the first access node over the first air-interface connection and the second access node over the second air-interface connection, the operations including:
  making a determination of whether both (i) the second access node is threshold highly loaded and (ii) the UE is likely to engage in a threshold high extent of data communication when served by the second access node, and
  responsive to the determination being affirmative, forgoing from adding for the UE the second air-interface connection between the UE and the second access nodes,
  wherein making the determination of whether both (i) the second access node is threshold highly loaded and (ii) the UE is likely to engage in a threshold high extent of data communication when served by the second access node comprises at least one of (a) determining whether both (i) the second access node has threshold high downlink load and (ii) the UE is likely to engage in a threshold high extent of downlink data communication when served by the second access node or (b) determining whether both (i) the second access node has threshold high uplink load and (ii) the UE is likely to engage in a threshold high extent of uplink data communication when served by the second access node.

16. The first access node of claim 15, wherein making the determination comprises making a first determination that the second access node is threshold highly loaded and, responsive to making the first determination, then making a second determination that the UE is likely to engage in a threshold high extent of data communication when served by the second access node.

17. The first access node of claim 15, wherein determining that the UE is likely to engage in the threshold high extent of data communication when served by the second access node is predictive based on historical data load of the UE.

18. The first access node of claim 17, wherein determining that the UE is likely to engage in the threshold high extent of data communication when served by the second access node is based on uplink buffer fullness as to data buffered for uplink transmission by the UE.

19. At least one non-transitory computer readable medium having stored thereon instructions executable by at least one processor to carry out operations for controlling configuration of dual connectivity of a user equipment device (UE) in a system in which the UE is served by a first access node over a first air-interface connection between the UE and the first access node and in which the configuration of the dual connectivity comprises adding for the UE a second air-interface connection between the UE and a second access node to enable concurrent service of the UE by the first access node over the first air-interface connection and the second access node over the second air-interface connection, the operations comprising:
 making a determination of whether both (i) the second access node is threshold highly loaded and (ii) the UE is likely to engage in a threshold high extent of data communication when served by the second access node; and
 responsive to the determination being affirmative, forgoing from adding for the UE the second air-interface connection between the UE and the second access node,
 wherein making the determination of whether both (i) the second access node is threshold highly loaded and (ii) the UE is likely to engage in a threshold high extent of data communication when served by the second access node comprises at least one of (a) determining whether both (i) the second access node has threshold high downlink load and (ii) the UE is likely to engage in a threshold high extent of downlink data communication when served by the second access node or (b) determining whether both (i) the second access node has threshold high uplink load and (ii) the UE is likely to engage in a threshold high extent of uplink data communication when served by the second access node.

* * * * *